United States Patent [19]

McEvily

[11] Patent Number: 4,869,027

[45] Date of Patent: Sep. 26, 1989

[54] KNIFE HOLDING AND SHARPENING CASSETTE AND KNIVES THEREFOR

[76] Inventor: John B. McEvily, 955 Boulevard, Westfield, N.J. 07090

[21] Appl. No.: 142,617

[22] Filed: Jan. 11, 1988

[51] Int. Cl.[4] .............................................. B23F 21/03

[52] U.S. Cl. ................................ 51/204; 51/205 WG; 51/211 R; 51/214; 30/138

[58] Field of Search ............. 51/204, 205 WG, 211 R, 51/214, 285; 76/86, 82, 88; 30/138; 206/349, 317, 553, 372, 373, 499, 503–509, 515–520, 576

[56] References Cited

U.S. PATENT DOCUMENTS

| | | | |
|---|---|---|---|
| D. 225,559 | 12/1972 | Bayly | D44/29 |
| D. 230,122 | 1/1974 | Bayly | D7/74 |
| D. 232,899 | 9/1974 | Bayly | D7/74 |
| D. 249,923 | 10/1978 | Bayly | D7/74 |
| D. 279,951 | 8/1985 | Winyard | D7/74 |
| 2,413,169 | 12/1946 | Case | 51/214 |
| 2,475,937 | 7/1949 | Alexander | 51/214 |
| 2,744,320 | 5/1956 | Palermo | 30/138 |
| 2,767,530 | 10/1956 | Paldanius . | |
| 2,826,879 | 3/1958 | Evans | 51/214 |
| 3,323,668 | 6/1967 | Hills | 206/509 |
| 3,676,961 | 7/1972 | Jackson | 51/214 |
| 3,774,350 | 11/1973 | Bayly | 51/204 |
| 3,861,246 | 1/1975 | Waller | 76/86 |
| 3,889,809 | 6/1975 | McNair | 206/372 |
| 4,041,651 | 8/1977 | Bayly | 51/214 |
| 4,091,691 | 5/1978 | Bayly | 76/86 |
| 4,117,748 | 10/1978 | Watts | 76/86 |
| 4,494,339 | 1/1985 | Pittaway | 51/204 |
| 4,604,836 | 8/1986 | Huang | 51/214 |

FOREIGN PATENT DOCUMENTS 51116 12/1985 Australia .

1023945 1/1978 Canada .

*Primary Examiner*—Frederick R. Schmidt
*Assistant Examiner*—Maurina Rachuba
*Attorney, Agent, or Firm*—Pennie & Edmonds

[57] ABSTRACT

A cassette for holding, storing and, when desired, sharpening knives having an elongated body member having an opening at one end and defining a hollow space therein for receiving at least one knife blade which is inserted through the opening; tungsten carbide elements for sharpening an edge of the knife blade located within the hollow space; and post and wall members for guiding the knife blade into the hollow space of the body member comprising a pair of spaced elongated members attached to the body member for lateral guidance of the blade in a manner so as to align the blade edge at a predetermined orientation with respect to the sharpening elements so that, when desired, the edge may be sharpened thereby by engagement therewith, wherein the dimensions of the opening and hollow space are larger than the width of the blade such that the blade may be inserted into and removed from the body member without contacting the sharpening elements by the user exerting a force on the blade in a direction away from the sharpening means, and further wherein the blade may be inserted into or removed from the body member in engagement with the sharpening elements, if desired, by the user exerting a force on the blade in a direction toward the sharpening elements for sharpening of the edge, wherein the amount of force exerted by the user on the blade when the edge is engaged with the sharpening elements can be varied to provide the desired degree of sharpness to the edge. Also, multiple cassettes and knives therefore.

44 Claims, 2 Drawing Sheets

KNIFE HOLDING AND SHARPENING CASSETTE AND KNIVES THEREFOR

TECHNICAL FIELD

This invention relates to a cassette for holding, storing and sharpening many ordinary household knives, as well as to certain knives which are particularly designed to be received and held in such cassettes and, when necessary, sharpened thereby.

BACKGROUND ART

It is troublesome to constantly maintain ordinary house-hold knives in a sharpened condition due to the variations in actual time of usage of the knife. The user does not always remember when the blade should be sharpened until the knife is so dull that it will not cut. Often, it is not convenient to hone or otherwise sharpen the knife blade before each use and, over time, the cutting edge becomes dull, thus rendering the knife difficult to use. Furthermore, the extent of resharpening necessary depends directly upon the dullness of the knife with the duller knives requiring a considerable amount of metal to be removed to produce a precise, sharp cutting edge.

A number of prior art patents have recognized this deficiency with such ordinary knives, and provide a housing or scabbard for receiving, protecting and sharpening the cutting edge of a knife blade as the blade is inserted into or withdrawn from the scabbard. Typical patents in this area include U.S. Pat. Nos. 2,475,937, 2,744,320, 2,767,530, 3,676,961, 3,774,350, 3,861,246, 3,889,809, 4,041,651, 4,091,691 and 4,117,748. Each of these patents discloses a device which is designed to sharpen the knife blade upon its insertion into and/or withdrawal from the scabbard. Furthermore, certain of these patents, such as the '691 patent, for example, include a device which sharpens the knife both on insertion into and withdrawal from the scabbard. Each of these patents include means, such as a spring, a latch member or a resilient member, for biasing the knife blade toward the sharpening elements.

It has now been realized that these devices are deficient because they sharpen the blade upon each insertion and/or removal from the device, whether or not the blade requires sharpening. The sharpening action causes metal to be removed from the blade each time the knife is placed in and out of the scabbard. Most of the time, after a single use of the knife, it is not necessary to sharpen the blade. Hence, these devices provide an unnecessary sharpening which causes the eventual wearing away of the blade.

Another knife sharpener is disclosed in U.S. Pat. No. 4,494,339. This device is similar to those mentioned above in that a spring is used to press the knife blade edge against the sharpener; however, an adjustment knob is provided to vary the spring force and the extent of sharpening of the blade. This spring force may, if desired, be set to zero so as to render the sharpener ineffective.

The device described above is still deficient, however, in that the user of the knife must set the spring force each time the knife is inserted or withdrawn. As a practical matter, most users will set the adjustment at an intermediate position so that, in effect, the device performs the same as those discussed above.

The present invention provides a solution to this problem in a convenient cassette which both holds, protects, and, only when desired, simply and easily sharpens the blade of the knife to the desired extent. Use of this device avoids the continuous wearing of the blade, yet provides a sharpening device which is readily available for use at the desire of the user, and in which the amount of force used to sharpen the knife blade, if any, is imparted by the user.

SUMMARY OF THE INVENTION

The invention is directed to a cassette for holding, storing and, when desired, sharpening knives which comprises an elongated body member having an opening at one end and defining a hollow space therein for receiving at least one knife blade which is inserted through the opening, means for sharpening an edge of the knife blade located within the hollow space, and means for guiding the knife blade into the hollow space of the body member in a manner so as to align the blade edge at a predetermined orientation with respect to the sharpening means so that, when desired, the edge may be sharpened thereby. The dimensions of the opening and hollow space are larger than the width of the blade such that the blade may be inserted into and removed from the body member without contacting or engaging the sharpening means. This is done by the user exerting a force on the blade in a direction away from the sharpening means.

Conversely, the blade may be inserted into or removed from the body member in engagement with the sharpening means, if desired, by the user exerting a force on the blade in a direction towards the sharpening means for sharpening of the edge. The amount of force exerted by the user on the blade when the edge is engaged with the sharpening means can be varied by the user to provide the desired degree of sharpness to the edge. Conveniently, the necessary force may be exerted upon the blade by exerting a force upon one of the body member or knife handle. This allows left-handed or right-handed users to easily sharpen the blade edge when desired.

Preferably, the guiding means comprises either a pair of post members or a pair of spaced elongated members, or both, for lateral guidance of the blade during insertion into or removal from the cassette. These members each comprise an elongated wall attached to the elongated body member for guiding the blade into the body member perpendicular to the sharpening means. The cassette of the invention may also include means for releaseably connecting the knife to the body member for storage thereof. The connection means provides a connecting force which is sufficient to maintain the knife attached to the cassette despite gravitational separation forces. This enables either the cassette or the knife handle to be hung or mounted upon a wall while remaining attached to the other.

It is advantageous for the connecting means to include at least one groove in the hollow space of the body member and at least one corresponding rib member located upon a knife blade handle for releasable engagement thereof. For more secure engagement, two elongated grooves, located on opposite sides of the hollow space, with two corresponding elongated rib members located on opposite sides along the width of the knife blade can be used.

Alternately, the connecting means of the cassette may be first and second releaseable locking means, wherein the first locking means is as described above, and the second locking means comprises at least one resilient tab member on the body member for engagement of at least one slot member of a knife blade handle. If desired, the hollow space can be provided with means for urging the knife blade slot member against the tab member for a more secure locking engagement therewith. The urging means, preferably in the form of a ramp member located on an upper portion of the hollow space, is used for contact with the knife handle to bias the handle toward the tab means.

The knife blade handle slot member will include at least one elongated groove, and the second locking means will be a pair of spaced resilient tab members for engagement with the groove. In addition, the ramp member may include at least one rib member for releasable interlocking engagement with a groove on said knife handle. Generally, the sharpening means comprises a pair of tungsten carbide elements oriented at a fixed angle with respect to the edge of the knife blade.

Another embodiment of the invention relates to a cassette having means for releaseably connecting its body member to a body member of another cassette. This connection means may be a raised area on the body member for interlocking engagement with a corresponding depressed area of the body member of another cassette. In addition, the body member of a cassette may include both raised and depressed areas located on opposite sides thereof for engaging a depressed area of a second cassette and a raised area of a third cassette, respectively. This arrangement enables a wide variety of multiple cassettes to be prepared. Such a cassette may be used for holding, storing and, when desired, sharpening a plurality of knives.

Preferably, the body member includes at least one aperture for draining fluids therefrom to facilitate cleaning of the cassette or removal of fluids introduced therein by the knife blade. Also, the cassette may include means for mounting the cassette upon a wall or the like, wherein the mounting means forms part of the body member of the cassette or a part of the knife blade handle.

A further embodiment of the invention relates to a combination comprising any of the previously described cassettes and a knife having a blade and a handle which is adapted to be releasably connected to the body member of the cassette.

BRIEF DESCRIPTION OF THE DRAWINGS

Preferred embodiments of the invention are described hereinbelow with reference to the attached drawing figures wherein.

DETAILED DESCRIPTION OF THE PREFERRED EMBODIMENTS

Figure 2:
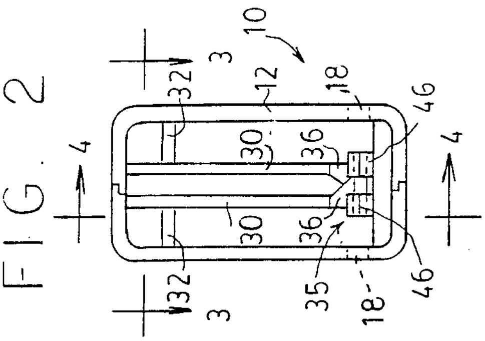
FIG. 2 is an end view looking through the front of the cassette of FIG. 1.
Figure 5:
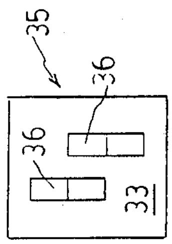
FIG. 5 is a top view of the sharpening elements for the cassette of FIG. 1.
Figure 1:
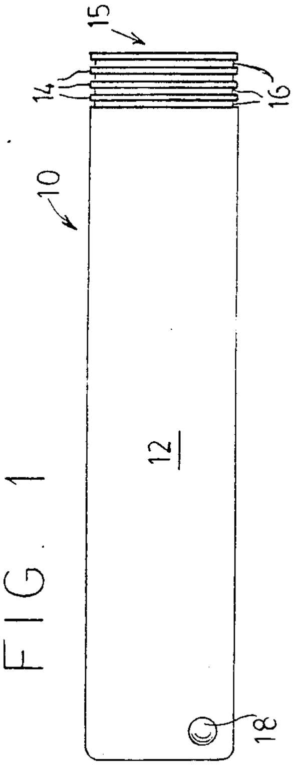
FIG. 1 is a side view of a cassette according to the invention.

The present invention provides storage means for a knife blade in the form of a cassette which serves to protect the cutting edge of the blade when the knife is not in use, and which incorporates a sharpening device whereby the cutting edge of the knife blade may be sharpened, if desired, by the user exerting the desired amount of force to engage the edge with the sharpening means during movement of the knife blade into or out of the cassette.

For convenience of description, the end of the cassette through which the knife blade is inserted will be hereinafter be referred to as the front end of the cassette. Thus, the relative terms "front" and "rear," or words of similar import, as used throughout this specification are to be construed in relation to the front and rear ends of the cassette and the knives used therewith.

Similarly, the words "upper" and "lower," or words of similar import, such as "top" and "bottom" as used throughout this specification are to be construed in relation to the upper and lower (cutting edge) portions, respectively, of the knife blade. In this regard, the cassette of the invention will be hereinafter described as arranged to hold a knife blade perpendicularly therein with respect to the upper and lower sides of the knife, having its cutting edge at the bottom.

According to the present invention, the cassette includes an elongated housing having a passage therein for receiving a knife blade and being adapted to protect the cutting edge of that blade while the knife is stored awaiting use. If desired, means may be provided for securing either the knife or the housing to a bench, wall, cupboard, or other fixture. The housing passage is open at one end to receive the knife blade and may be closed at the other end by a wall of the housing. Also, it is preferred that the housing be configured to be only slightly greater than the knife blade, as shown in the drawings, for compact storage.

A typical knife to which the invention applies includes a blade which may be sharpened along a lower edge to form a cutting edge, and having a handle attached to or formed integral with the blade. If desired, the knife handle may be specifically dedicated to the cassette for releaseable locking engagement therewith.

Referring initially to FIGS. 1-5, there is illustrated a cassette 10 according to the invention. The body 12 is elongated and hollow with a generally rectangular cross sectional shape. The front end of cassette 10 forms an opening 15 for insertion of a knife 25 and includes a plurality of ribs 14 and grooves 16 on the outer and inner surfaces thereof. In addition to imparting an ornamental design to the cassette, these ribs 14 and grooves 16 provide a means for releasable interlocking engagement with a knife handle 20 having a similar design, as will be further explained below.

Figure 3:
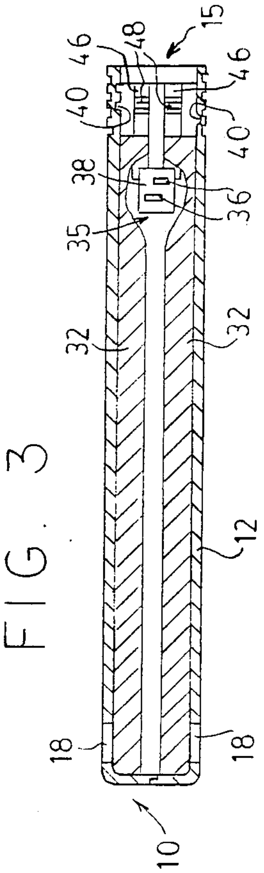
FIG. 3 is a top view, partially in cross section, of the cassette of FIG. 1 taken along lines 3—3 of FIG. 2.
Figure 4:
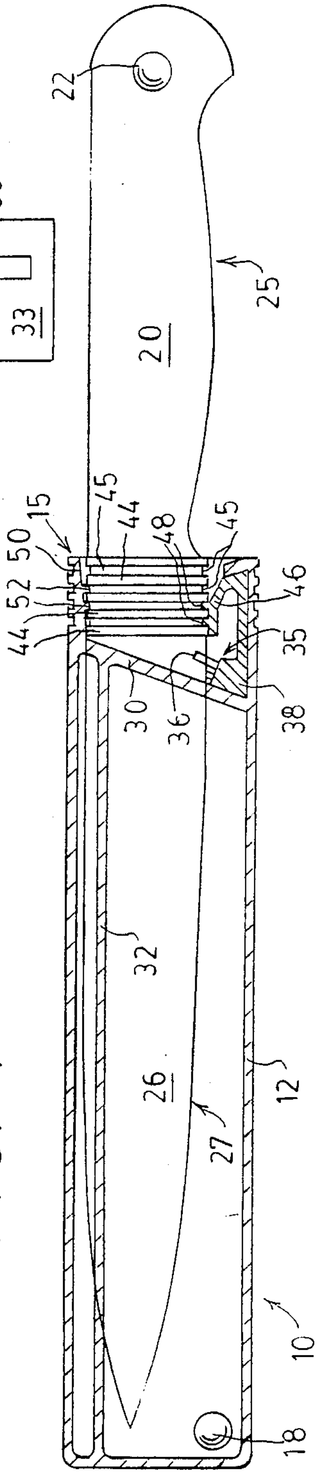
FIG. 4 is a cross section of the cassette of FIG. 1, taken along lines 4—4 of FIG. 2 and illustrating a knife inserted therein.

FIGS. 1-4 also illustrate an aperture 18 extending through the cassette body 12 for mounting the cassette 10 (with or without a knife attached thereto) upon a hook or pin extending from a vertical surface, such as a wall. FIG. 4 shows that the knife handle 20 may alternately or also include a similar aperture 22 for such mounting purposes. The interlocking engagement between the knife handle 20 and cassette 10 is sufficiently strong to resist separation due to gravitational forces acting upon the weight of either the cassette or knife when the combination is mounted in a vertical position.

FIG. 2 illustrates the internal components of the cassette which extend into the hollow interior of the body 12. Two spaced apart vertical posts 30 are utilized as an initial guide for the knife blade 26. For more accurate guiding and alignment of the knife blade 26 within the cassette 10, a pair of spaced longitudinally extending horizontal wall members 32 are utilized. These guiding means 30, 32 assure proper orientation of the knife blade 26 within the cassette, which orientation is important for obtaining proper alignment of the blade 26 with the sharpening block 35 for sharpening of the blade edge 28.

The sharpening block 35 consists of a pair of spaced tungsten carbide elements or bits 36 which are installed in a base 38 in a manner so as to form a "V" shape which is engaged with the blade edge for sharpening thereof. The degree of slope of the sides of the "V" can be routinely selected by one skilled in the art to provide the desired edge characteristics necessary for the intended cutting applications of the knife. As illustrated, the front bit contacts and sharpens one side of the blade edge while the rear bit contacts and sharpens the other side of the blade edge.

The cassette 10 is preferably injection molded from a thermoplastic material such as ABS to form a rigid enclosure for the blade. To facilitate the molding operation, it is preferred that the cassette be molded in two halves, which halves can then be joined by an adhesive or by ultrasonic welding to form the cassette body. Thereafter, the sharpening block assembly can be inserted and securely attached to complete the cassette.

Referring now to FIG. 3, means for releasable interlocking engagement of the cassette 10 with the knife handle 20 are illustrated in the form of a plurality of grooves 40 located on opposite internal sidewalls of the hollow space of the cassette 10 at the forward end 15. These grooves 40 engage the ribs 44 formed on the knife handle 20 as the knife 25 is inserted into the cassette 10 to releasably interlock the knife handle into the cassette. As shown in this FIG. 3, the further the knife is inserted into the cassette enables the grooves 40 to further engage additional ribs with a more secure interlock being achieved. As noted above, it is desirable for this connection to be sufficiently strong to resist separation of the knife and cassette when the combination is hung vertically, but it must also be releasable so that a user can remove the knife from the cassette for future cutting operations.

In addition, second means for releasable interlocking engagement of the cassette and knife handle can be used to achieve the desired connection. FIG. 4 illustrates this second means in the form of a pair of resilient arms 46 each of which carries a tab 48 for engagement with grooves 45 on the bottom of the knife handle 20. As occurs with the first engagement means, the further the knife blade is inserted into the cassette, the further the tabs 48 are enabled to engage the grooves 45 closer to the front end of the handle (i.e., the end away from the blade). To impart the desired resiliency to the arms and tabs, such members are preferably made of an engineering thermoplastic such as, for example, an acetal resin.

To achieve a higher degree of interlock, the top inner wall of the cassette opening 15 is angled to act as a ramp which increases the downward force on the knife handle as the blade is inserted into the cassette. If desired, it is possible to include one or two additional rib members 52 extending across the ramp 50 for releasable interlocking engagement with the grooves 45 at the top of the knife handle. One skilled in the art can best select the number of interlocking means for the desired cassette and knife combination, with the larger, heavier knives generally requiring the additional means, while the smaller lighter knives requiring only a single set of grooves and ribs to achieve the desired connection.

FIG. 4 illustrates that the tungsten carbide bits 36 are permanently mounted in the sharpening block 35 at a fixed angle with respect to the knife blade edge. This angle is set at about 20° with respect to the vertical for optimum sharpening results. Also, the blade edge is maintained perpendicular to the bits for easiest sharpening. As shown, it is particularly advantageous to construct the sharpening block, resilient arms and tabs as a single assembly which can be inserted into the cassette body after the molding operation. As previously described, a polyacetal resin or other engineering thermoplastic is preferred as the material for this assembly.

As noted above, sufficient clearance is provided in the cassette opening so that the knife blade may be inserted and removed without engaging the tungsten carbide bits. When it is desired to sharpen the blade edge, however, a simple procedure is implemented by the user. Since the plastic cassette is sufficiently rigid, and, of course, the knife handle is integrally connected to the blade, the user merely grasps the cassette with one hand and the knife handle with the other hand. It is immaterial as to which hand grasps which component, thus avoiding differences in manufacture or operation to accommodate right or left-handed individuals. The user may exert a downward force on the knife handle or an upward force on the cassette, or both, to achieve the desired degree of force necessary to achieve the appropriate extent of sharpening of the blade. This feature of the invention is novel over all prior art references which utilize a spring or other mechanical member to impart the necessary blade edge sharpening force. This invention enables the user to impart any degree of force as needed in their judgment to provide the optimum shaprness or fineness to the blade edge for the intended cutting application.

Figure 6:
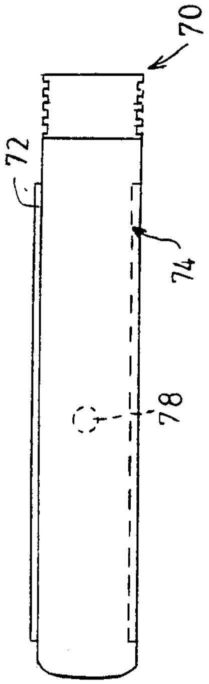
FIG. 6 is a side view of another cassette according to the invention.
Figure 7:
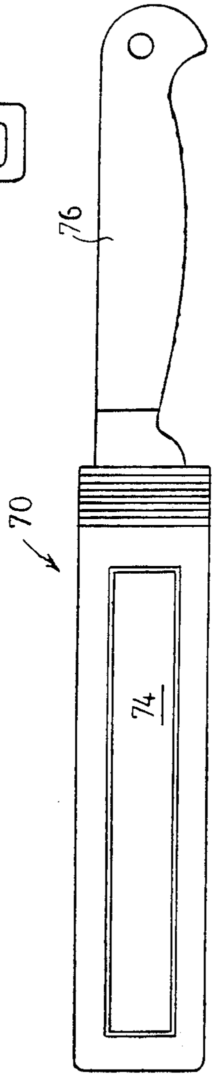
FIG. 7 is a side view of another cassette similar to that of FIG. 6 and illustrating a knife inserted therein.

Referring now to FIGS. 6–10, there is illustrated an alternate embodiment of the cassettes of this invention. The cassette 70 shown in FIGS. 6 and 7 is similar to that of FIG. 1 except for the removal of mounting hole 18 and the addition of means for connecting the cassette 70 to another cassette of similar design. FIG. 7 also illustrates knife 76 inserted in the cassette 70.

The connecting means includes a raised area 72 having a generally rectangular cross sectional shape on one side of the cassette, and a corresponding depressed area 74 of substantially identical size on the opposite side of the cassette 70. Accordingly, any two such cassettes may be connected by a press-fit or snap-locking engagement of the raised area 72 of one cassette with the depressed area 74 of a second cassette.

Figure 9:
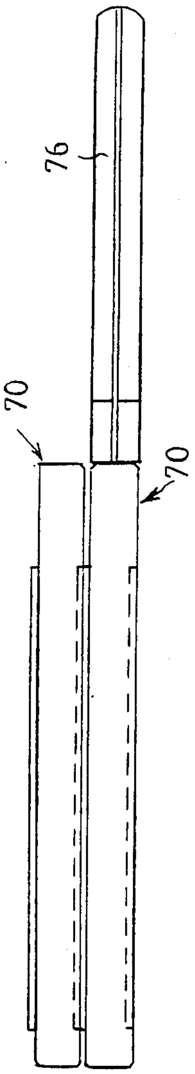
FIG. 9 is a top view of a multiple cassette formed by connecting the cassettes of FIG. 6 and 7.
Figure 10:
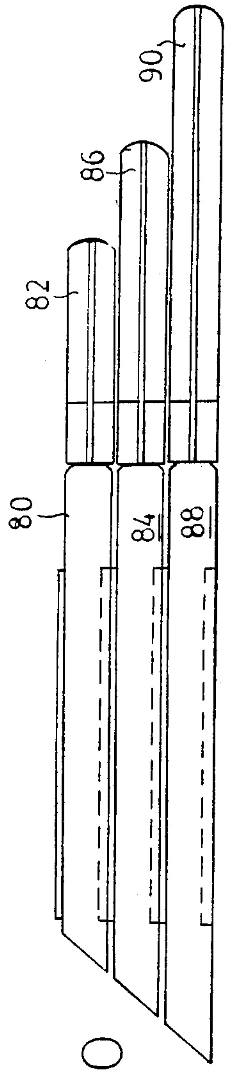
FIG. 10 is a side view of another multiple cassette formed by connecting separate individual cassettes.

FIG. 9 illustrates the interconnection of the cassettes of FIGS. 6 and 7 to form a multiple cassette. FIG. 10 illustrates another set of interconnected cassettes 80, 84, 88 with different sized knives 82, 86, 90, inserted into each cassette 80, 84, 88, respectively. These cassettes are interconnected in the same manner as discussed above with respect to FIGS. 6, 7 and 9. The individual cassettes can be separated from the multiple cassette combination when and if its respective knife blade requires sharpening which may then proceed as discussed above.

Figure 8:
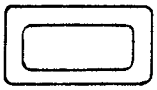
FIG. 8 is an end view of the cassette of FIG. 7 to illustrate a drainage hole therefore.

The cassette of FIG. 6 also includes a drainage hole 78 located in the center of the bottom wall of the body member. This hole assists in the drainage of fluids from the cassette when the cassette is cleaned or immersed in solutions. FIG. 8 illustrates an alternate drainage hole appearing at the front end of the cassette of FIG. 7 for achieving results similar to that achieved by hole 78 of the cassette of FIG. 6.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A cassette for holding, storing and, when desired, sharpening knives comprising:

an elongated body member having an opening at one end and defining a hollow space therein for receiving at least one knife having a handle and a blade which is inserted through said opening;

means for sharpening an edge of said knife blade located within said hollow space;

means for releasably connecting said knife to said body member for storage thereof in any position without separation of the knife from the body member due to gravitational forces acting on the cassette or knife, said releasable connecting means located within said opening; and means for guiding said knife blade into said hollow space of the body member in a manner so as to align an edge of said blade at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge.

2. The cassette of claim 1 wherein said force exerted upon said blade is achieved by the user exerting a force upon one of said body member or knife handle and wherein said guiding means comprises a pair of spaced post members for lateral guidance of said knife blade.

3. The cassette of claim 1 wherein said guiding means comprises a pair of spaced elongated members for lateral guidance of said knife blade.

4. The cassette of claim 3 wherein said members each comprise an elongated wall attached to said elongated body member for guiding said blade into said body member perpendicular to said sharpening means.

5. The cassette of claim 1 wherein said means for releasably connecting said knife to said body member includes means for connecting said knife handle to said opening.

6. A combination comprising the cassette of claim 1 and a knife having a blade and a handle which is adapted to be releasably connected to said body member.

7. The cassette of claim 1 wherein said sharpening means comprises a pair of tungsten carbide elements oriented at a fixed angle with respect to said knife blade edge.

8. The cassette of claim 1 further comprising means for releaseably connecting said body member to a body member of another cassette.

9. The cassette of claim 8 wherein said connection means comprises a raised area on said body member for interlocking engagement with a corresponding depressed area of said body member of another cassette.

10. The cassette of claim 9 wherein said body member further comprises a depressed area for interlocking engagement with a corresponding raised area upon a body member of another cassette, said depressed area located on an opposite side of said body member from said raised area.

11. The cassette of claim 1 wherein said body member further comprises at least one aperture for draining fluids therefrom.

12. The cassette of claim 1 further comprising means for mounting said cassette upon a wall or the like.

13. The cassette of claim 12 wherein said mounting means forms part of said knife blade handle.

14. The cassette of claim 12 wherein said mounting means forms part of said body member.

15. The cassette of claim 14 wherein said housing includes an aperture for drainage of liquids therefrom.

16. The cassette of claim 14 wherein said housing is made of a rigid material which completely encompasses said knife blade when placed therein.

17. The cassette of claim 16 wherein said mounting means comprises an aperture in said housing.

18. The cassette of claim 1 wherein said sharpening means is fixed in said housing at an angle of about 20° with respect to the vertical for optimum sharpening of the knife blade.

19. A cassette for holding, storing and, when desired, sharpening knives comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member in a manner so as to align an edge of said blade at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge; and means for releasably connecting said knife to said body member for storage thereof, wherein said connecting means comprises at least one groove in the hollow space of said body member and at least one corresponding rib member located upon a knife blade handle for releasable engagement thereof.

20. The cassette of claim 19 wherein said connecting means comprises two elongated grooves located on opposite sides of said hollow space with two corresponding elongated rib members located on opposite sides along the width of said knife blade.

21. A cassette for holding, storing and, when desired, sharpening knives comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member in a manner so as to align an edge of said blade at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired by the user exerting a force on said blade in a direction toward said sharpening means for sharpening of said edge, wherein the amount of force exerted by the user on said blade when the edge is engaged with said sharpening means can be varied to provide the desired degree of sharpness to said edge; and means for releasably connecting said knife to said body member for storage thereof, wherein said connecting means comprises first and second releasable locking means.

22. The cassette of claim 21 wherein said first locking means comprises at least one groove in the hollow space of said body member and at least one corresponding rib member located upon a knife blade handle for releasable engagement thereof.

23. The cassette of claim 21 wherein said first locking means comprises two elongated grooves located on opposite sides of said hollow space with at least two corresponding elongated rib members located on opposite sides along the width of said knife blade.

24. The cassette of claim 21 wherein said second locking means comprises at least one resilient tab member on said body.member for engagement of at least one slot member of a knife blade handle.

25. The cassette of claim 24 wherein said hollow space further comprises means for urging said knife blade slot member against said at least one tab member for more secure locking engagement therewith.

26. The cassette of claim 24 wherein said knife blade handle slot member comprises at least one elongated groove and wherein said second locking means comprises a pair of spaced resilient tab members for engagement with said elongated groove.

27. The cassette of claim 25 wherein said urging means comprises a ramp member located on an upper portion of said hollow space for contact with said knife handle to bias said handle toward said at least one tab member.

28. The cassette of claim 27 wherein said ramp member includes at least one rib member for releasable interlocking engagement with a groove on said knife handle.

29. A cassette for holding, storing and, when desired, sharpening a plurality of knives comprising two or more cassettes each comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member in a manner so as to align an edge of said blade at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge, wherein said body member includes means for releasably connecting a second body member thereto, wherein said connecting means comprises a raised area on one body member for interlocking with a depressed area of the other body member; and wherein a raised area of at least one cassette is interlockingly engaged with a depressed area of at least one other cassette.

30. A cassette for holding, storing and, when desired, sharpening knives comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member comprising a pair of spaced elongated members attached to said body member for lateral guidance of said blade in a manner so as to align said blade edge at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge; and means for releaseably connecting said knife blade within said body member for storage thereof wherein said connection means provides a connecting force which is sufficient to maintain said knife blade within said cassette despite gravitational separation forces;

wherein said connecting means comprises two elongated grooves located on opposite sides of said hollow space with two corresponding elongated rib members located on opposite sides along the width of said knife blade.

31. The cassette of claim 30 wherein said connecting means further comprises releaseable locking means.

32. A combination comprising the cassette of claim 30 and a knife having a blade and a handle which is adapted to be releasably connected to said body member.

33. A cassette for holding, storing and, when desired, sharpening knives comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member comprising a pair of spaced elongated members attached to said body member for lateral guidance of said blade in a manner so as to align said blade edge at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means by the user exerting a force on said blade in a direction away from said sharpening means, and further wherein said blade may be inserted into or removed from said body member in engagement with said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge; and means for releaseably locking said knife blade within said body member for storage thereof wherein said connection means means provides a connecting force which is sufficient to maintain said knife blade within said cassette despite gravitational separation forces;

wherein said locking means comprises at least one groove in the hollow space of said body member and at least one corresponding rib member located upon a knife blade handle for releasable engagement thereof.

34. The cassette of claim 33 wherein said locking means comprises at least one resilient tab member on said body member for engagement of at least one slot member of a knife blade handle.

35. The cassette of claim 34 wherein said hollow space further comprises means for urging said knife blade slot member against said at least one tab member for more secure locking engagement therewith, said urging means comprising a ramp member located on an upper portion of said hollow space for contact with said knife handle to bias said handle toward said tab member.

36. The cassette of claim 35 further comprising means for releaseably connecting said body member to a body member of another cassette.

37. The cassette of claim 36 wherein said connection means comprises a raised area on said body member for interlocking engagement with a corresponding depressed area of said body member of another cassette.

38. The cassette of claim 37 wherein said body member further comprises a depressed area for interlocking engagement with a corresponding raised area upon a body member of another cassette, said depressed area located on an opposite side of said body member from said raised area.

39. A cassette for holding, storing and, when desired, sharpening a plurality of knives comprising two or more cassettes each comprising:

an elongated body member having an opening at one end and defining a hollow space therein for receiving at least one knife blade which is inserted through said opening;

means for sharpening an edge of said knife blade located within said hollow space;

means for guiding said knife blade into said hollow space of the body member comprising a pair of spaced elongated members attached to said body member for lateral guidance of said blade in a manner so as to align said blade edge at a predetermined orientation with respect to said sharpening means so that, when desired, said edge may be sharpened thereby by engagement therewith, wherein the dimensions of said opening and hollow space are larger than the width of said blade such that said blade may be inserted into and removed from said body member without contacting said sharpening means, if desired, by the user exerting a force on said blade in a direction toward said sharpening means for sharpening of said edge, wherein the amount of force exerted by the user on said blade when the edge is engaged with said sharpening means can be varied to provide the desired degree of sharpness to said edge;

means for releasably connecting said knife blade within said body member for storage thereof wherein said connection means comprising at least one resilient tab member on said body member for engagement of at least one slot member of a knife blade handle so as to provide a connecting force which is sufficient to maintain said knife blade within said cassette despite gravitational separation forces; and means for releasable interlocking connection of at least one cassette with at least one other cassette.

40. A combination comprising the cassette of claim 39 and two or more knives, each of which has a blade and a handle which is adapted to be releasably connected to one of said body members.

41. The combination of claim 40 further comprising means for mounting said combination upon a wall or the like.

42. The combination of claim 41 wherein said mounting means forms part of one or more of said body members.

43. The combination of claim 41 wherein said mounting means forms part of one or more of said knife blade handles.

44. The cassette of claim 39 wherein said sharpening means is fixed in said housing at an angle of about 20° with respect to the vertical for optimum sharpening of the knife blade.

* * * * *